United States Patent
Lee (10) Patent No.: US 12,170,356 B2
(45) Date of Patent: Dec. 17, 2024

(54) BATTERY APPARATUS AND COOLING CONTROL METHOD THEREOF

(71) Applicant: LG ENERGY SOLUTION, LTD., Seoul (KR)

(72) Inventor: Bokyun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 494 days.

(21) Appl. No.: 17/610,326

(22) PCT Filed: Apr. 21, 2021

(86) PCT No.: PCT/KR2021/005039
§ 371 (c)(1),
(2) Date: Nov. 10, 2021

(87) PCT Pub. No.: WO2021/261734
PCT Pub. Date: Dec. 30, 2021

(65) Prior Publication Data
US 2022/0311073 A1   Sep. 29, 2022

(30) Foreign Application Priority Data

Jun. 23, 2020  (KR) ........................ 10-2020-0076296

(51) Int. Cl.
*H01M 50/284*  (2021.01)
*H01M 10/613*  (2014.01)
*H01M 10/635*  (2014.01)

(52) U.S. Cl.
CPC ....... *H01M 10/635* (2015.04); *H01M 10/613* (2015.04); *H01M 50/284* (2021.01); *H01M 2220/20* (2013.01)

(58) Field of Classification Search
CPC . H01M 10/635; H01M 10/613; H01M 50/284
See application file for complete search history.

(56) References Cited

U.S. PATENT DOCUMENTS

| 2012/0046815 | A1 | 2/2012 | Hermann et al. |
| 2014/0174712 | A1 | 6/2014 | Yang et al. |
| (Continued) | | | |

FOREIGN PATENT DOCUMENTS

| DE | 10 2018 206 634 A1 | 10/2019 |
| JP | 2001-130268 A | 5/2001 |
| (Continued) | | |

OTHER PUBLICATIONS

Extended European Search Report for corresponding European Application No. 21797926.9, dated Aug. 8, 2022.

*Primary Examiner* — Olatunji A Godo
(74) *Attorney, Agent, or Firm* — Birch, Stewart, Kolasch & Birch, LLP (57) ABSTRACT

Disclosed is a battery apparatus that measures a temperature of the battery apparatus, determines an estimated naturally-decreasing temperature based on information including a difference between the temperature of the battery apparatus and an atmospheric temperature in response to the temperature of the battery apparatus being higher than the atmospheric temperature, determine a stop temperature based on a reference temperature of the stop temperature and the estimated naturally-decreasing temperature, and stops a cooling operation of the battery apparatus in response to the temperature of the battery apparatus being lower than the stop temperature.

10 Claims, 4 Drawing Sheets

(56) References Cited

U.S. PATENT DOCUMENTS

| | | |
|---|---|---|
| 2017/0088006 A1 | 3/2017 | Blatchley et al. |
| 2018/0198173 A1* | 7/2018 | Ichikawa ............ H01M 10/625 |
| 2018/0312076 A1 | 11/2018 | Lee |
| 2021/0354591 A1 | 11/2021 | Iida et al. |

FOREIGN PATENT DOCUMENTS

| | | |
|---|---|---|
| JP | 2007-80727 A | 3/2007 |
| JP | 2010-200604 A | 9/2010 |
| JP | 2014-148245 A | 8/2014 |
| JP | 2015-11886 A | 1/2015 |
| JP | 2016-199153 A | 12/2016 |
| JP | 6071344 B2 | 2/2017 |
| JP | 2018-103841 A | 7/2018 |
| KR | 10-0282883 B1 | 4/2001 |
| KR | 10-1438962 B1 | 9/2014 |
| KR | 10-2018-0120952 A | 11/2018 |
| WO | WO 2020/084964 A1 | 4/2020 |

* cited by examiner

BATTERY APPARATUS AND COOLING CONTROL METHOD THEREOF

TECHNICAL FIELD

Cross-Reference to Related Application

This application claims priority to and the benefit of Korean Patent Application No. 10-2020-0076296 filed in the Korean Intellectual Property Office on Jun. 23, 2020, the entire contents of which are incorporated herein by reference.

The described technology relates to a battery apparatus and a cooling control method thereof.

BACKGROUND ART

An electric vehicle or a hybrid vehicle is a vehicle that obtains power by driving a motor mainly using a battery as a power source. The electric vehicles are being actively researched because they are alternatives that can solve pollution and energy problems of internal combustion vehicles. In addition, rechargeable batteries are used in various electronic devices other than the electric vehicles.

Since there is internal resistance in a battery, a battery temperature increases as the battery is repeatedly charged and discharged. Because the increase of the battery's temperature affects battery performance and durability, a cooling system is used to keep the battery at a constant temperature. A cooling operation of the battery is controlled based on the temperature measured by a temperature sensor installed in the cooling system. In general, when the battery temperature exceeds a threshold temperature, the cooling operation of the cooling system starts. When the battery temperature falls below a specified temperature by the cooling operation, the cooling operation of the cooling system stops.

In a situation where a vehicle is driving and atmospheric temperature is lower than the battery temperature, a cooling effect of the battery can be expected due to convection. However, since the existing cooling systems operate until the battery temperature falls below the specified temperature without considering ambient influences, power consumption may be high and the durability of the cooling system may be reduced.

DISCLOSURE

Technical Problem

Some embodiments may provide a battery apparatus and a cooling control method thereof for considering ambient influences.

Technical Solution

According to an embodiment, a battery apparatus including a battery module, a cooling device configured to cool the battery module, and a processing circuitry may be provided. The processing circuitry may determine an estimated naturally-decreasing temperature of the battery module based on information including a difference between a temperature of the battery module and an atmospheric temperature in response to the temperature of the battery module being higher than the atmospheric temperature, determine a stop temperature based on a reference temperature of the stop temperature and the estimated naturally-decreasing temperature, and stop an operation of the cooling device in response to the temperature of the battery module being lower than the stop temperature.

In some embodiments, the processing circuitry may determine the reference temperature as the stop temperature in response to the temperature of the battery module being not higher than the atmospheric temperature.

In some embodiments, the processing circuitry may determine a sum of the reference temperature and the estimated naturally-decreasing temperature as the stop temperature.

In some embodiments, the estimated naturally-decreasing temperature increases with an increase in the difference between the temperature of the battery module and the atmospheric temperature and decreases with a decrease in the difference between the temperature of the battery module and the atmospheric temperature.

In some embodiments, the information may further include a speed of a mobility apparatus on which the battery apparatus is mounted.

In some embodiments, the estimated naturally-decreasing temperature is lower when the speed of the mobility apparatus decreases and is higher when the speed of the mobility apparatus increases.

In some embodiments, the processing circuitry may determine the reference temperature as the stop temperature in response to the speed of the mobility apparatus being zero.

According to another embodiment, a cooling control method of a battery apparatus mounted on a mobility apparatus may be provided. The battery apparatus may measure a temperature of the battery apparatus, determine an estimated naturally-decreasing temperature of the battery apparatus based on information including a difference between the temperature of the battery apparatus and an atmospheric temperature in response to the temperature of the battery apparatus being higher than the atmospheric temperature, determine a stop temperature based on a reference temperature of the stop temperature and the estimated naturally-decreasing temperature, and stop a cooling operation of the battery apparatus in response to the temperature of the battery apparatus being lower than the stop temperature.

Advantageous Effects

According to some embodiments, power consumption due to an operation of a cooling device can be reduced, and the durability of the cooling device can be increased.

MODE FOR INVENTION

In the following detailed description, only certain embodiments have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

When it is described that an element is "connected" to another element, it should be understood that the element may be directly connected to the other element or connected to the other element through a third element. On the other hand, when it is described that an element is "directly connected" to another element, it should be understood that the element is connected to the other element through no third element.

As used herein, a singular form may be intended to include a plural form as well, unless the explicit expression such as "one" or "single" is used.

In flowcharts described with reference to the drawings, the order of operations or steps may be changed, several operations or steps may be merged, a certain operation or step may be divided, and a specific operation or step may not be performed.

Figure 1:
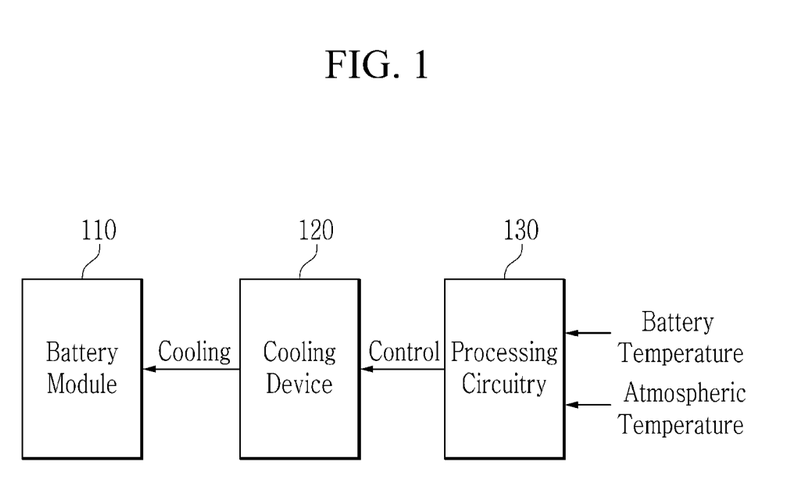
FIG. 1 is a drawing showing a battery apparatus according to an embodiment.

FIG. 1 is a drawing showing a battery apparatus according to an embodiment.

Referring to FIG. 1, a battery apparatus 100 has a structure that can be electrically connected to an external apparatus. When the external apparatus is a load, the battery apparatus 100 is discharged by operating as a power supply that supplies power to the load. When the external apparatus is a charger, the battery apparatus 100 is charged by receiving external power through the charger. The external apparatus operating as the load may be, for example, an electronic device, a mobility apparatus, or an energy storage system (ESS). The mobility apparatus may be, for example, an electric vehicle, a hybrid vehicle, or a smart mobility.

The battery apparatus 100 includes a battery module 110, a cooling device 120, and a processing circuitry 130.

The battery module 110 includes a plurality of battery cells (not shown) that are electrically connected to each other. In some embodiments, the battery cell may be a rechargeable battery. In one embodiment, in the battery module 110, a predetermined number of battery cells are connected in series to configure a battery set to supply desired power. In another embodiment, in the battery module 110, a predetermined number of battery sets may be connected in series or in parallel to supply desired power.

The cooling device 120 performs an operation of cooling the battery module 110, and a cooling operation may be controlled by the processing circuitry 130. Various cooling devices capable of lowering a temperature of the battery module 110 may be used as the cooling device 120. In some embodiments, the cooling device(s) 120 may be disposed on one or both sides of the battery module 110. For example, a cooling passage through which cooling water moves may be formed in the cooling device 120, and a flow of the cooling water through the cooling passage may be controlled by the processing circuitry 130. As another example, the cooling device 120 may include a cooling fan, and an operation of the cooling fan may be controlled by the processing circuitry 130.

The processing circuitry 130 controls the cooling operation of the cooling device 120 based on the temperature of the battery module 110 and an atmospheric temperature. In some embodiments, when the external apparatus is the mobility apparatus such as a vehicle, the processing circuitry 130 may further consider a speed of the vehicle to control the cooling operation of the cooling device 120.

In some embodiments, the processing circuitry 130 may include a processor. The processor may be, for example, a micro controller unit (MCU). In some embodiments, the processing circuitry 130 may be included in a battery management system that manages the battery module 110.

In some embodiments, the battery apparatus 100 may further include a temperature sensor for sensing the temperature of the battery module 110. In some embodiments, a temperature sensor for sensing the atmospheric temperature may be mounted on the battery apparatus 100 or the external apparatus. In some embodiments, the battery management system may collect the temperature of the battery module 110 and the atmospheric temperature, and provide them to the processing circuitry 130.

Next, a cooling control method of a battery apparatus according to various embodiments is described with reference to FIG. 2 to FIG. 4.

Figure 2:
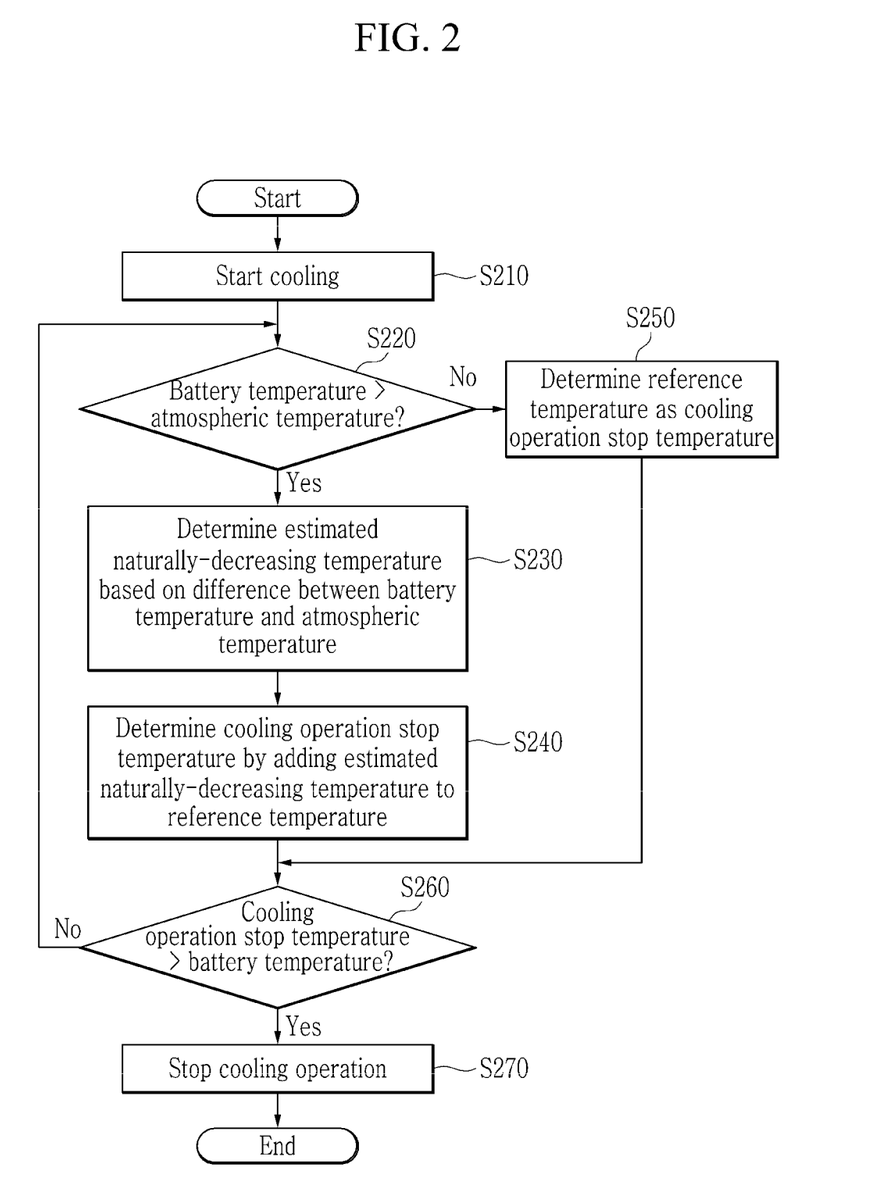
FIG. 2 is a flowchart showing a cooling control method according to an embodiment.

FIG. 2 is a flowchart showing a cooling control method according to an embodiment.

Referring to FIG. 1 and FIG. 2, when a temperature of a battery module 110 exceeds a threshold temperature, a processing circuitry 130 controls a cooling device 120 to start a cooling operation at S210. The temperature of the battery module 110 can decrease by the cooling operation of the cooling device 120.

Next, the processing circuitry 130 compares the temperature of the battery module 110 with an atmospheric temperature at S220. In some embodiments, the processing circuitry 130 may receive the temperature of the battery module 110 from a temperature sensor mounted on the battery module 110. The processing circuitry 130 may also receive the atmospheric temperature from a temperature sensor mounted in a position capable of measuring the atmospheric temperature.

When the temperature of the battery module 110 is higher than the atmospheric temperature at S220, the processing circuitry 130 adjusts a cooling operation stop temperature to be used when determining to stop the cooling operation of the cooling device 120 at S230 and S240. In some embodiments, the processing circuitry 130 may determine the cooling operation stop temperature based on a reference temperature, which is designated as a default value of the cooling operation stop temperature, and an estimated naturally-decreasing temperature at S240. In one embodiment, the processing circuitry 130 may determine the cooling operation stop temperature by adding the estimated naturally-decreasing temperature to the reference temperature of the cooling operation stop temperature at S240. The estimated naturally-decreasing temperature is a temperature at which the temperature of the battery module 110 is estimated to decrease due to ambient influences.

In some embodiments, the processing circuitry 130 may determine the estimated naturally-decreasing temperature based on a temperature difference between the temperature of the battery module 110 and the atmospheric temperature at S230. In one embodiment, the greater the difference between the temperature of the battery module 110 and the atmospheric temperature is, the higher the estimated naturally-decreasing temperature may be set. In one embodiment, a plurality of temperature difference intervals may be set according to a temperature range, and a corresponding estimated naturally-decreasing temperature may be assigned to each temperature difference interval. In this case, the higher a temperature of the temperature difference interval (e.g., an average temperature, a middle temperature, a minimum temperature, a maximum temperature, or etc. of the temperature difference interval) is, the higher the estimated naturally-decreasing temperature may be set. For example, the estimated naturally-decreasing temperature according to the temperature difference interval may be set as in Table 1.

Accordingly, the processing circuitry 130 may determine the estimated naturally-decreasing temperature corresponding to the difference between the temperature of the battery module 110 and the atmospheric temperature.

TABLE 1

| Temperature difference | Estimated temperature |
|---|---|
| 0~10 (° C.) | 1 (° C.) |
| 10~20 (° C.) | 2 (° C.) |
| 20~30 (° C.) | 3 (° C.) |

On the other hand, when the temperature of the battery module 110 is not higher than the atmospheric temperature at S220, the processing circuitry 130 sets the cooling operation stop temperature to be equal to the reference temperature at S250.

Next, the processing circuitry 130 compares the temperature of the battery module 110 with the cooling operation stop temperature at S260, and stops the cooling operation of the cooling device at S270 when the cooling operation stop temperature is higher than the temperature of the battery module 110. On the other hand, when the cooling operation stop temperature is not higher than the temperature of the battery module 110, the cooling operation of the battery module 110 is continued and the process of S220 is repeated again.

As described above, according to an embodiment, since the battery module can be cooled due to convection in a situation where the atmospheric temperature is lower than the temperature of the battery module, the lower the atmospheric temperature is, the higher the cooling operation stop temperature may be set. Accordingly, the lower the atmospheric temperature is, the faster the cooling device can stop. As a result, power consumption due to the operation of the cooling device can be reduced without affecting the cooling of the battery module, and the durability of the cooling device can be increased.

Figure 3:
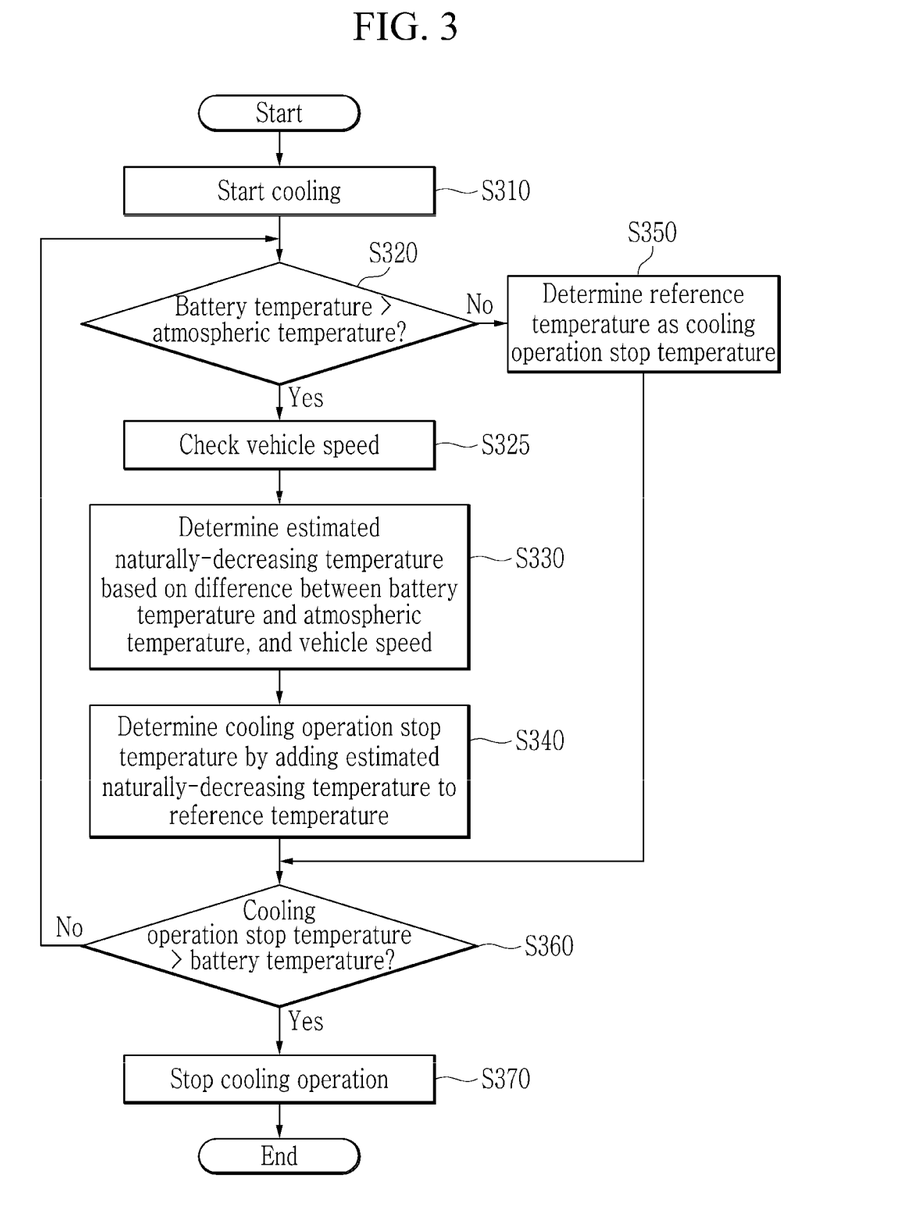
FIG. 3 is a flowchart showing a cooling control method according to another embodiment.

FIG. 3 is a flowchart showing a cooling control method according to another embodiment.

Referring to FIG. 1 and FIG. 3, when a temperature of a battery module 110 exceeds a threshold temperature, a processing circuitry 130 controls a cooling device 120 to start a cooling operation at S310. Next, the processing circuitry 130 compares the temperature of the battery module 110 with an atmospheric temperature at S320.

When the temperature of the battery module 110 is higher than the atmospheric temperature at S320, the processing circuitry 130 checks a speed of a mobility apparatus (e.g., vehicle) equipped with a battery apparatus at S325, and adjusts a cooling operation stop temperature at S330 and S340. In some embodiments, the processing circuitry 130 may determine the cooling operation stop temperature based on a reference temperature of the cooling operation stop temperature and an estimated naturally-decreasing temperature at S340. In one embodiment, the processing circuitry 130 may determine the cooling operation stop temperature by adding the estimated naturally-decreasing temperature to the reference temperature of the cooling operation stop temperature at S340.

In some embodiments, the processing circuitry 130 may determine the estimated naturally-decreasing temperature based on a temperature difference between the temperature of the battery module 110 and the atmospheric temperature, and the speed of the vehicle at S330. In one embodiment, the greater the difference between the temperature of the battery module 110 and the atmospheric temperature is, the higher the estimated naturally-decreasing temperature may be set, and the faster the speed of the vehicle is, the higher the estimated naturally-decreasing temperature may be set. In one embodiment, a plurality of temperature difference intervals may be set according to a temperature range, and a corresponding estimated naturally-decreasing temperature may be assigned to each temperature difference interval. In this case, the higher a temperature of the temperature difference interval (e.g., an average temperature, a middle temperature, a minimum temperature, a maximum temperature, or etc. of the temperature difference interval) is, the higher the estimated naturally-decreasing temperature may be set. In one embodiment, a plurality of vehicle speed intervals may be set according to a range of a vehicle speed, and a corresponding estimated naturally-decreasing temperature may be assigned to each vehicle speed interval. In this case, the faster a speed of the vehicle speed interval (e.g., an average speed, a middle speed, a minimum speed, a maximum speed, or etc. of the vehicle speed interval) is, the higher the estimated naturally-decreasing temperature may be set. For example, the estimated naturally-decreasing temperature according to the temperature difference interval and the vehicle speed interval may be set as in Table 2. Accordingly, the processing circuitry 130 may determine the estimated naturally-decreasing temperature corresponding to the difference between the temperature of the battery module 110 and the atmospheric temperature, and the speed of the vehicle.

TABLE 2

| | Vehicle speed | | |
|---|---|---|---|
| Temperature difference | 0~40 (km/h) | 40~80 (km/h) | 80~ (km/h) |
| 0~10 (° C.) | 1 (° C.) | 2 (° C.) | 3 (° C.) |
| 10~20 (° C.) | 2 (° C.) | 3 (° C.) | 4 (° C.) |
| 20~30 (° C.) | 3 (° C.) | 4 (° C.) | 5 (° C.) |

On the other hand, when the temperature of the battery module 110 is not higher than the atmospheric temperature at S320, the processing circuitry 130 sets the cooling operation stop temperature to be equal to the reference temperature at S350.

Next, the processing circuitry 130 compares the temperature of the battery module 110 with the cooling operation stop temperature at S360, and stops the cooling operation of the cooling device at S370 when the cooling operation stop temperature is higher than the temperature of the battery module 110. On the other hand, when the cooling operation stop temperature is not higher than the temperature of the battery module 110, the cooling operation of the battery module 110 is continued and the process of S320 is repeated again.

As described above, according to another embodiment, since the battery module can be cooled due to convection in a situation where the atmospheric temperature is lower than the temperature of the battery module, the lower the atmospheric temperature is, the higher the cooling operation stop temperature may be set. In particular, the faster the speed of the vehicle equipped with the battery module is, the higher the convection effect is. Therefore, the faster the speed of the vehicle is, the higher the cooling stop temperature can be set. As a result, the lower the atmospheric temperature is or the faster the speed of the vehicle is, the faster the cooling device can stop. Accordingly, power consumption due to the operation of the cooling device can be reduced without affecting the cooling of the battery module, and the durability of the cooling device can be increased.

Figure 4:
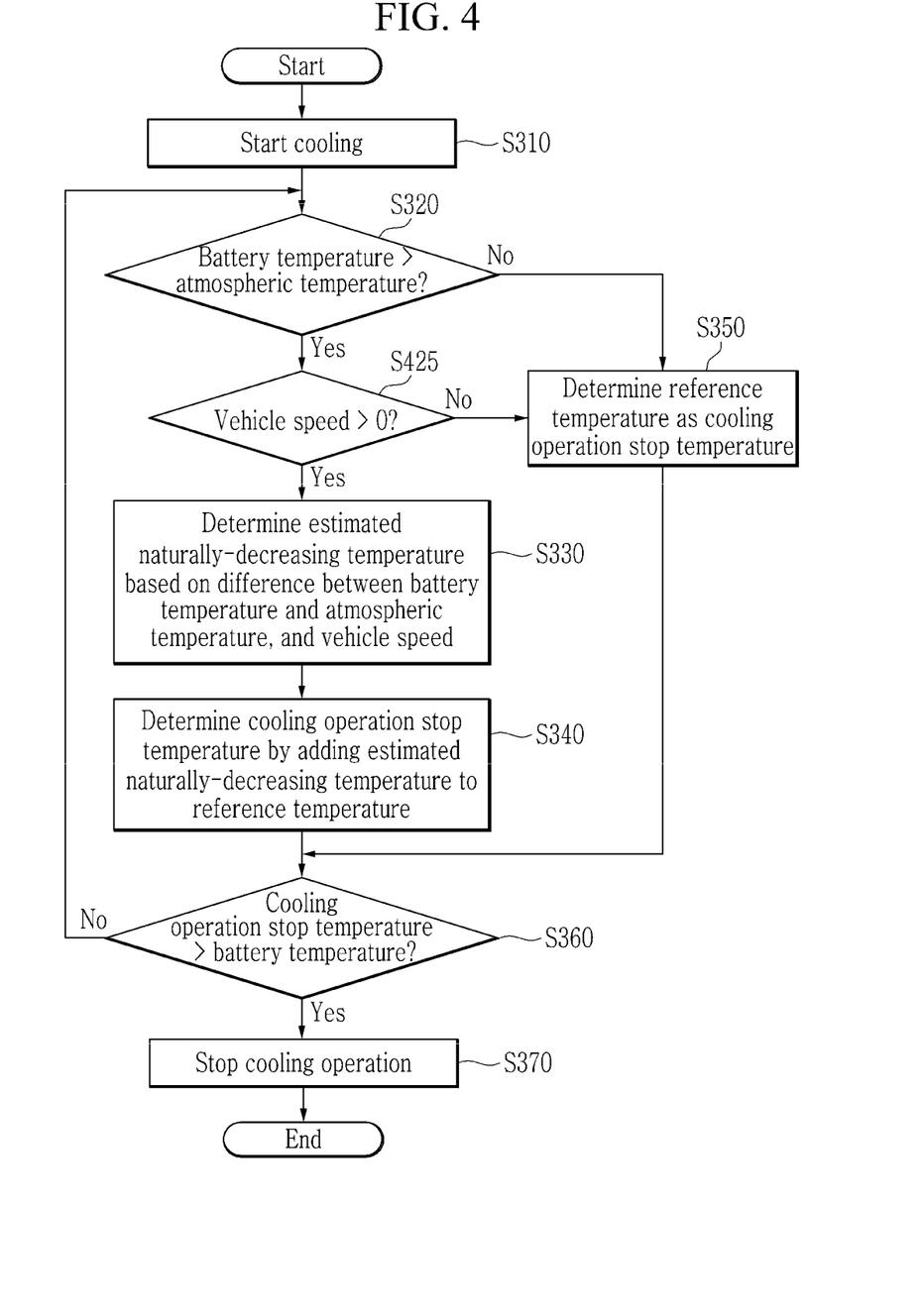
FIG. 4 is a flowchart showing a cooling control method according to yet another embodiment.

FIG. 4 is a flowchart showing a cooling control method according to yet another embodiment.

A convection effect can be expected when a vehicle is moving. Accordingly, in yet another embodiment, a cooling operation stop temperature may not be adjusted when the vehicle is not moving, differently from embodiments described with reference to FIG. 3.

Referring to FIG. 1 and FIG. 4, when a temperature of a battery module 110 is higher than an atmospheric temperature at S320, a processing circuitry 130 determines whether a speed of a vehicle equipped with a battery apparatus is greater than zero at S425. When the speed of the vehicle is greater than zero at S425, the processing circuitry 130 adjusts a cooling operation stop temperature at S330 and S340, as described with reference to FIG. 3.

On the other hand, when the speed of the vehicle is not higher than zero at S425, even if the temperature of the battery module 110 is higher than the atmospheric temperature at S425, the processing circuitry 130 sets the cooling operation stop temperature to be equal to a reference temperature at S350.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

The invention claimed is:

1. A battery apparatus comprising:
   a battery module;
   a cooling device configured to cool the battery module; and
   a processing circuitry configured to determine a duration of the cooling operation, the processing circuitry configured to:
   when a temperature of the battery module exceeds a threshold temperature, start a cooling operation of the cooling device,
   determine an estimated naturally-decreasing temperature of the battery module based on information including a difference between the temperature of the battery module and an atmospheric temperature in response to the temperature of the battery module being higher than the atmospheric temperature,
   determine a cooling operation stop temperature based on a preset reference temperature and the estimated naturally-decreasing temperature, and
   stop the cooling operation of the cooling device in response to the temperature of the battery module becomes lower than the cooling operation stop temperature,
   wherein the estimated naturally-decreasing temperature is determined by setting a plurality of temperature difference intervals based on the difference between the temperature of the battery module and the atmospheric temperature, setting a corresponding estimated naturally-decreasing temperature to each temperature difference interval, and selecting an estimated naturally-decreasing temperature corresponding to a temperature distance interval containing the difference between the temperature of the battery module and the atmospheric temperature,
   wherein an increase in the difference between the temperature of the battery module and the atmospheric temperature causes a decrease in the duration of the cooling operation,
   wherein the information further includes a speed of a mobility apparatus on which the battery apparatus is mounted, and
   wherein the estimated naturally-decreasing temperature is lower when the speed of the mobility apparatus decreases and is higher when the speed of the mobility apparatus increases.

2. The battery apparatus of claim 1, wherein the processing circuitry is configured to determine the preset reference temperature as the cooling operation stop temperature in response to the temperature of the battery module being not higher than the atmospheric temperature.

3. The battery apparatus of claim 1, wherein the processing circuitry is configured to determine a sum of the reference temperature and the estimated naturally-decreasing temperature as the cooling operation stop temperature.

4. The battery apparatus of claim 1, wherein the estimated naturally-decreasing temperature is higher with an increase in the difference between the temperature of the battery module and the atmospheric temperature and is lower with a decrease in the difference between the temperature of the battery module and the atmospheric temperature.

5. The battery apparatus of claim 1, wherein the processing circuitry is configured to determine the preset reference temperature as the cooling operation stop temperature in response to the speed of the mobility apparatus being zero.

6. A cooling control method of a battery apparatus mounted on a mobility apparatus, the method comprising:
   measuring a temperature of the battery apparatus; and
   determining a duration of a cooling operation, the duration of the cooling operation being determined by:
   starting the cooling operation of the battery apparatus when the temperature of the battery module exceeds a threshold temperature;
   determining an estimated naturally-decreasing temperature of the battery apparatus based on information including a difference between the temperature of the battery apparatus and an atmospheric temperature in response to the temperature of the battery apparatus being higher than the atmospheric temperature;
   determining a cooling operation stop temperature based on a preset reference temperature of the cooling operation stop temperature and the estimated naturally-decreasing temperature; and
   stopping the cooling operation of the battery apparatus when the temperature of the battery apparatus becomes lower than the cooling operation stop temperature,
   wherein the estimated naturally-decreasing temperature is determined by setting a plurality of temperature difference intervals based on the difference between the temperature of the battery module and the atmospheric temperature, setting a corresponding estimated naturally-decreasing temperature to each temperature difference interval, and selecting an estimated naturally-decreasing temperature corresponding to a temperature distance interval containing the difference between the temperature of the battery module and the atmospheric temperature, wherein an increase in the difference between the temperature of the battery module and the atmospheric temperature causes a decrease in the duration of the cooling operation, wherein the information further includes a speed of the mobility apparatus, and wherein the estimated naturally-decreasing temperature is lower when the speed of the mobility apparatus decreases and is higher when the speed of the mobility apparatus increases.

7. The method of claim 6, further comprising determining the preset reference temperature as the cooling operation stop temperature in response to the temperature of the battery apparatus being not higher than the atmospheric temperature.

8. The method of claim 6, wherein the estimated naturally-decreasing temperature is higher with an increase in the difference between the temperature of the battery module and the atmospheric temperature and is lower with a decrease in the difference between the temperature of the battery module and the atmospheric temperature.

9. The battery apparatus of claim 1, wherein the processing circuitry is further configured to check the speed of the mobility apparatus on which the battery apparatus is mounted.

10. The method of claim 6, further comprising checking the speed of the battery apparatus mounted on the mobility apparatus.

\* \* \* \* \*